(12) United States Patent
Putterman et al.

(10) Patent No.: US 8,931,010 B2
(45) Date of Patent: Jan. 6, 2015

(54) METHODS AND APPARATUS FOR CLIENT AGGREGATION OF MEDIA IN A NETWORKED MEDIA SYSTEM

(75) Inventors: Daniel Putterman, San Francisco, CA (US); Brad Dietrich, San Francisco, CA (US); John Doornbos, San Francisco, CA (US); Jeremy Toeman, San Francisco, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 2013 days.

(21) Appl. No.: 10/288,505

(22) Filed: Nov. 4, 2002

(65) Prior Publication Data

US 2004/0088731 A1    May 6, 2004

(51) Int. Cl.
*H04N 5/445* (2011.01)
*H04L 29/06* (2006.01)

(52) U.S. Cl.
CPC ........ *H04L 65/605* (2013.01); *H04L 29/06027* (2013.01); *H04L 65/4084* (2013.01)
USPC .............................................. 725/48; 725/44

(58) Field of Classification Search
CPC .......................... H04N 21/462; H04N 21/4622
USPC ............. 725/11, 55, 59, 118, 119, 48, 74–85, 725/44–45; 710/11
See application file for complete search history.

(56) References Cited

U.S. PATENT DOCUMENTS

| | | | |
|---|---|---|---|
| 5,506,932 A | 4/1996 | Holmes et al. | |
| 5,571,672 A | 11/1996 | Slavicek et al. | |
| 5,751,672 A | 5/1998 | Yankowski | |
| 5,793,366 A | 8/1998 | Mano et al. | |
| 5,798,921 A | 8/1998 | Johnson et al. | |
| 5,815,297 A | 9/1998 | Ciciora | |
| 5,835,126 A | 11/1998 | Lewis | |
| 5,883,621 A | 3/1999 | Iwamura | |
| 5,930,473 A | 7/1999 | Teng et al. | |
| 5,945,988 A | 8/1999 | Williams et al. | |

(Continued)

FOREIGN PATENT DOCUMENTS

| | | |
|---|---|---|
| EP | 0 932 275 | 7/1999 |
| EP | 0 932 275 A2 | 7/1999 |

(Continued)

OTHER PUBLICATIONS

U.S. Appl. No. 09/910,316, filed Jul. 19, 2001, Putterman.

(Continued)

*Primary Examiner* — Nasser Goodarzi
*Assistant Examiner* — Michael Hong
(74) *Attorney, Agent, or Firm* — Ropes & Gray LLP

(57) ABSTRACT

A network client aggregates media items available in a media system. The network consists of a plurality of nodes, including at least two media server nodes. A client node generates an internal request to obtain a list of media items available in the media system. In response, the client node generates a request for a list of media items from each individual media server node on the network. Each media server node sends their list of media items to the client node. The client node aggregates the lists of media items from each of the media server nodes. Thus, a list of media items available on the media system is aggregated to a requesting client node in the media system.

30 Claims, 9 Drawing Sheets

(56) References Cited

U.S. PATENT DOCUMENTS

| | | | |
|---|---|---|---|
| 5,969,283 A | 10/1999 | Looney | |
| 5,977,964 A | 11/1999 | Williams et al. | |
| 6,008,802 A | 12/1999 | Iki et al. | |
| 6,032,202 A | 2/2000 | Lea et al. | |
| 6,038,614 A | 3/2000 | Chan et al. | |
| 6,085,236 A | 7/2000 | Lea | |
| 6,111,677 A | 8/2000 | Shintani et al. | |
| 6,118,450 A | 9/2000 | Proehl | |
| 6,154,206 A | 11/2000 | Ludtke | |
| 6,160,796 A | 12/2000 | Zou | |
| 6,169,725 B1* | 1/2001 | Gibbs et al. | 370/216 |
| 6,177,931 B1 | 1/2001 | Alexander et al. | |
| 6,182,094 B1* | 1/2001 | Humpleman et al. | 715/234 |
| 6,208,341 B1 | 3/2001 | van Ee et al. | |
| 6,219,839 B1* | 4/2001 | Sampsell | 725/40 |
| 6,232,539 B1 | 5/2001 | Looney et al. | |
| 6,236,395 B1 | 5/2001 | Sezan et al. | |
| 6,237,049 B1 | 5/2001 | Ludtke | |
| 6,243,725 B1 | 6/2001 | Hempleman | |
| 6,263,503 B1 | 7/2001 | Margulis | |
| 6,289,165 B1 | 9/2001 | Abecassis | |
| 6,353,700 B1 | 3/2002 | Zhou | |
| 6,356,971 B1 | 3/2002 | Katz | |
| 6,359,661 B1 | 3/2002 | Nickum | |
| 6,393,430 B1 | 5/2002 | Van Ryzin | |
| 6,466,080 B2 | 10/2002 | Kawai | |
| 6,487,145 B1 | 11/2002 | Berhan | |
| 6,577,735 B1 | 6/2003 | Bharat | |
| 6,647,417 B1 | 11/2003 | Hunter et al. | |
| 6,657,116 B1 | 12/2003 | Gunnerson | |
| 6,741,617 B2 | 5/2004 | Rosengren et al. | |
| 6,751,402 B1 | 6/2004 | Elliott et al. | |
| 6,816,175 B1 | 11/2004 | Hamp et al. | |
| 6,826,512 B2 | 11/2004 | Dara-Abrams et al. | |
| 6,839,769 B2 | 1/2005 | Needham | |
| 6,882,793 B1 | 4/2005 | Fu | |
| 6,901,603 B2 | 5/2005 | Zeidler | |
| 6,931,593 B1 | 8/2005 | Grooters | |
| 6,938,101 B2 | 8/2005 | Hayes et al. | |
| 7,039,643 B2 | 5/2006 | Sena et al. | |
| 7,058,635 B1* | 6/2006 | Shah-Nazaroff et al. | 707/100 |
| 7,231,175 B2 | 6/2007 | Ellis | |
| 7,240,356 B2* | 7/2007 | Iki et al. | 725/48 |
| 7,260,421 B2* | 8/2007 | Harris | 455/567 |
| 7,430,753 B2* | 9/2008 | Gray et al. | 725/80 |
| 7,483,958 B1* | 1/2009 | Elabbady et al. | 709/217 |
| 2001/0004338 A1 | 6/2001 | Yankowski | |
| 2001/0026287 A1 | 10/2001 | Watanabe | |
| 2001/0039660 A1 | 11/2001 | Vasilevsky | |
| 2001/0042107 A1* | 11/2001 | Palm | 709/218 |
| 2001/0043700 A1 | 11/2001 | Shima et al. | |
| 2002/0010652 A1 | 1/2002 | Deguchi | |
| 2002/0046315 A1 | 4/2002 | Miller | |
| 2002/0059588 A1 | 5/2002 | Huber | |
| 2002/0059621 A1 | 5/2002 | Thomas et al. | |
| 2002/0059642 A1 | 5/2002 | Russ | |
| 2002/0069746 A1 | 6/2002 | Taira et al. | |
| 2002/0070982 A1 | 6/2002 | Hill | |
| 2002/0078293 A1 | 6/2002 | Kou et al. | |
| 2002/0082901 A1 | 6/2002 | Dunning et al. | |
| 2002/0104091 A1 | 8/2002 | Prabhu et al. | |
| 2002/0113824 A1 | 8/2002 | Myers, Jr. | |
| 2002/0166123 A1 | 11/2002 | Schrader | |
| 2002/0174444 A1 | 11/2002 | Gatto | |
| 2002/0180803 A1 | 12/2002 | Kaplan | |
| 2002/0188735 A1 | 12/2002 | Needham | |
| 2002/0194260 A1 | 12/2002 | Headley | |
| 2003/0035404 A1 | 2/2003 | Ozluturk | |
| 2003/0046437 A1 | 3/2003 | Eytchison et al. | |
| 2003/0068154 A1 | 4/2003 | Zylka | |
| 2003/0110272 A1 | 6/2003 | Du Castel | |
| 2003/0135860 A1* | 7/2003 | Dureau | 725/82 |
| 2003/0149988 A1 | 8/2003 | Ellis | |
| 2003/0214955 A1 | 11/2003 | Kim | |
| 2003/0220091 A1 | 11/2003 | Farrand | |
| 2004/0117831 A1 | 6/2004 | Ellis | |
| 2004/0184763 A1 | 9/2004 | DiFrancesco | |
| 2004/0255326 A1 | 12/2004 | Hicks | |
| 2005/0028208 A1 | 2/2005 | Ellis | |
| 2005/0039208 A1 | 2/2005 | Veeck | |
| 2005/0155086 A1 | 7/2005 | Schick et al. | |
| 2005/0227611 A1 | 10/2005 | Ellis | |
| 2005/0246393 A1 | 11/2005 | Coates | |
| 2006/0004685 A1 | 1/2006 | Pyhalammi | |
| 2006/0080707 A1 | 4/2006 | Laksono | |
| 2006/0259949 A1 | 11/2006 | Schaefer | |
| 2006/0291434 A1* | 12/2006 | Gu et al. | 370/338 |
| 2007/0162661 A1 | 7/2007 | Fu et al. | |

FOREIGN PATENT DOCUMENTS

| | | |
|---|---|---|
| EP | 1217787 A2 | 6/2002 |
| EP | 1427148 | 11/2003 |
| JP | H11-341040 | 12/1999 |
| JP | 2003-162444 A | 6/2003 |
| JP | 2003-209893 A | 7/2003 |
| WO | WO99/14945 | 3/1999 |
| WO | WO99/14945 A1 | 3/1999 |
| WO | WO99/35753 | 7/1999 |
| WO | WO99/35753 A3 | 7/1999 |
| WO | WO99/64969 A2 | 12/1999 |
| WO | WO00/17738 A1 | 3/2000 |
| WO | WO00/17738 A2 | 3/2000 |
| WO | WO00/59230 A1 | 10/2000 |

OTHER PUBLICATIONS

U.S. Appl. No. 10/099,064, filed Mar. 14, 2002, Putterman.
U.S. Appl. No. 10/949,775, filed Sep. 23, 2004, Putterman.
U.S. Appl. No. 11/318,793, filed Dec. 27, 2005, Dietrich.
U.S. Appl. No. 11/444,564, filed Jun. 1, 2006, Dietrich.
U.S. Appl. No. 11/595,737, filed Nov. 10, 2006, Dietrich.
Written Opinion of the International Searching Authority for Related Foreign Application PCT/US03/35018.
U.S. Appl. No. 09/330,860, filed Jun. 11, 1999, Ellis.
U.S. Appl. No. 09/332,244, filed Jun. 11, 1999, Ellis.
U.S. Appl. No. 09/354,344, filed Jul. 16, 1999, Ellis.
Dimitrova, et al. "Personalizing Video Recorders Using Multimedia Processing and Integration." ACM 2001.
Haas et al., Proccedings of ICIP 2002 "Personalized News Through Content Augmentation and Profiling", Rochester, NY, Sep. 2002.
International Search Report of the International Searching Authority for related foreign application PCT/US2006/049398.
Office Action dated May 28, 2009 for related U.S. Appl. No. 10/949,775.
Office Action dated Feb. 3, 2010 for related JP Patent Application 2004-550446.
Office Action dated Feb. 25, 2010 for related EU Patent Application 06848226.4.
Office Action dated Jan. 4, 2010 for related U.S. Appl. No. 10/949,775.

* cited by examiner

METHODS AND APPARATUS FOR CLIENT AGGREGATION OF MEDIA IN A NETWORKED MEDIA SYSTEM

BACKGROUND OF THE INVENTION

1. Field of the Invention

The present invention is directed toward the field of converging disparate types of media, and more particularly directed toward a media device that aggregates media from multiple disparate devices over a network.

2. Art Background

The widespread use of computers, digital cameras, and the Internet has resulted in the creation and use of digital media. Digital media has also largely replaced more traditional analog audio and video formats with the introduction and popular acceptance of audio compact discs (CDs) and digital video discs (DVDs). In general, digital media consists of various formats of data that stores audio, video, and images in binary files. These binary files are typically stored on a medium accessible to computer devices, such as CD-ROMs, hard drives, floppy disks and memory sticks.

The storage of digital media on commonly used computer medium allows for easy generation and transfer of digital media. For example, it has become popular to generate digital photos using a digital camera and then to transfer the digital photos onto computers. Computer software permits the user to manipulate the digital photos. The user may then transfer the digital photos to friends using e-mail, or post the digital photos on a web site accessible by the World Wide Web. These types of applications, which take advantage of the connectivity among different devices, have also contributed to the widespread popularity of digital media.

Digital media may be stored in a variety of formats. Special hardware or software compatible with the formats of the digital media is required to playback or view the digital media. For example, to listen to music stored in the popular MP3 format, a consumer must have a special MP3 player (i.e., either software running on a general purpose computer or a stand alone MP3 player). There are numerous formats for video, including high quality DVDs and various compression based MPEG and proprietary standards. To playback various formats of digital video, the consumer must use a device that reads the proper format of the digital media.

Because of the numerous different formats of digital media, the playback or viewing of numerous types of digital media today requires multiple types of devices. The playback of digital media stored in different formats is less problematic on a computer because the computer may play the digital media using software programs. However, a consumer may desire to play the media on other types of devices. For example, the consumer may desire to play digital audio files on a home stereo and view digital video on a television. Currently, stereos and televisions are not equipped to playback all formats of digital media. Accordingly, it is desirable to provide a media convergence platform that integrates various types of digital media into a single system.

Aggregation of media in a home network is typically performed using a server. Under this technique, a server tracks the existence of all media items available on the home network. For example, a media server may be implemented on a personal computer. A digital audio jukebox may be coupled to the home network. To aggregate a list of all audio available on the home network, the server (personal computer) receives a list of the media items from the digital jukebox. For this implementation, the server acts as a central point to acquire a list of all audio available on the home network. This server aggregation architecture requires constant availability of the server. The server becomes a single point of failure. Furthermore, aggregating all media items through a server limits system throughput. Accordingly, it is desirable to generate a home media system that does not rely on server aggregation to acquire all media items on a home network.

SUMMARY OF THE INVENTION

A network client aggregates media items available in a media system. A plurality of nodes are coupled to the network. A node may comprise a device, which supports services for the media system, or a media server that presents at least one media item to the network. Each network node provides one or more services for the media system. At least two of the nodes comprise media server nodes. A media server node presents media items to the network. For example, a media server node may be a hard disk drive that stores MP3 music, or a media server node may be a gateway to the Internet for downloading media items. A client node generates an internal request to obtain a list of media items available in the media system. For example, a client node may comprise a television, and a user may request to view a list of all available media items in the system on the television screen.

In response to the client's internal request for media items, the client node generates a request for a list of media items from each individual media server node on the network. In one embodiment, the media system uses a discovery protocol to learn of media server nodes on the network. In response, each media server node sends their list of media items to the client node. The client node aggregates the lists of media items from each of the media server nodes. During the aggregation process, the client node determines whether each media item is unique from other media items on the aggregated list. Thus, a list of media items available on the media system is aggregated to a requesting client node in the media system.

In one embodiment, to obtain a list of media items from a media server, the client node invokes a service on the media server. The media system supports multiple protocols to communicate among nodes in the media system. First, the client node determines a protocol supported by a media server, and then uses the protocol to obtain a list of media items from the media server. The media system also supports multiple remote procedure call ("RPC") mechanisms to invoke procedures on the media server.

DETAILED DESCRIPTION

Media Convergence Platform

The user interface of the present invention provides an efficient and easy way for one or more users to manage and playback media within a "media space." As used herein, a "media space" connotes one or more media storage devices coupled to one or more media players for use by one or more users. The integration of media storage devices and media players into a single media space permits distributed management and control of content available within the media space.

Figure 1:
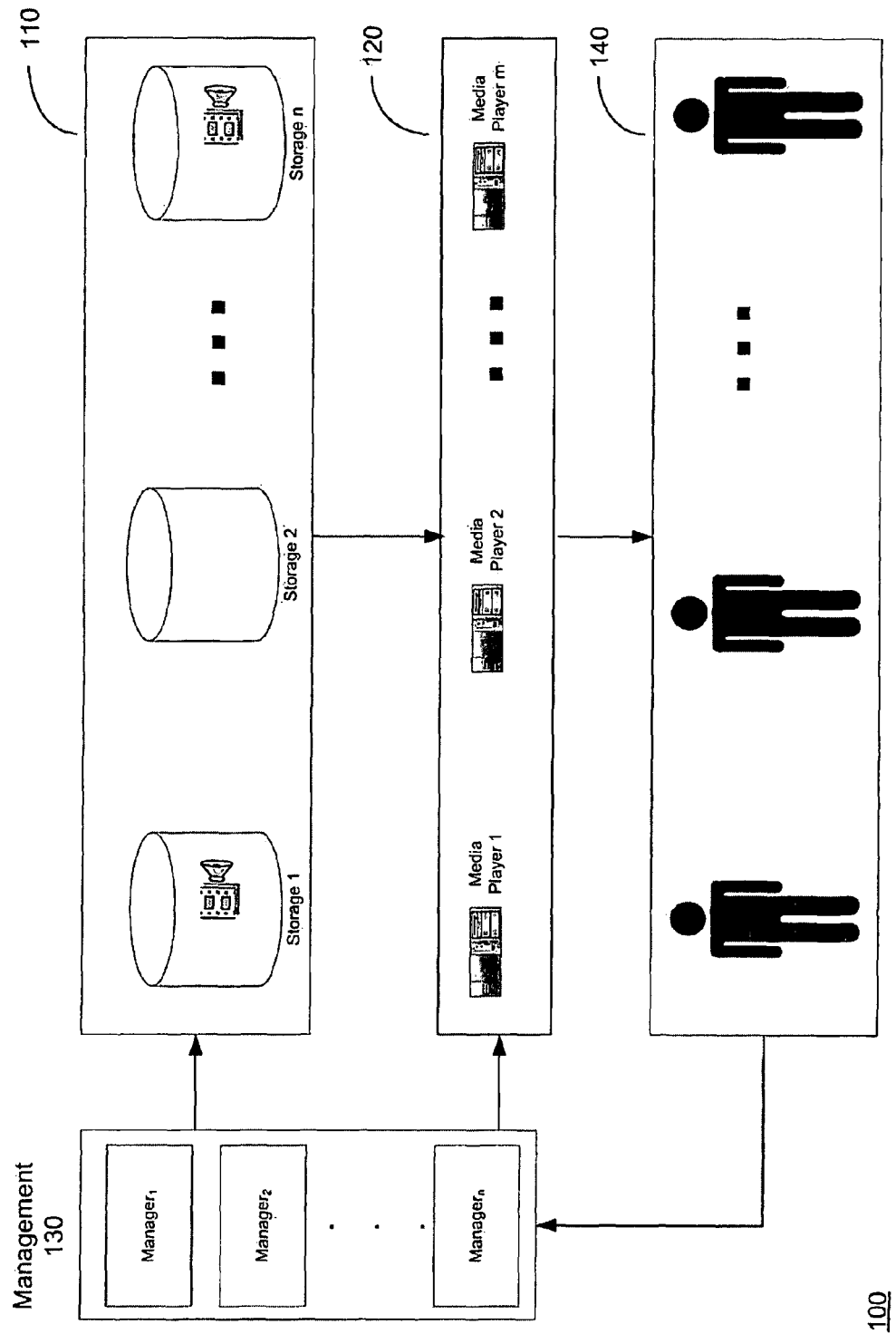
FIG. 1 illustrates a media space configured in accordance with one embodiment of the present invention.

FIG. 1 illustrates a media space configured in accordance with one embodiment of the present invention. As shown in FIG. 1, the media space 100 includes "n" media storage devices 110, where "n" is any integer value greater than or equal to one. The media storage devices 10 store any type of media. In one embodiment, the media storage devices 110 store digital media, such as digital audio, digital video (e.g., DVD, MPEG, etc.), and digital images. The media space 100 also includes "m" media players 120, where "m" is any integer value greater than or equal to one. In general, the media players 120 are devices suitable for playing and or viewing various types of media. For example, a media player may comprise a stereo system for playing music or a television for playing DVDs or viewing digital photos.

As shown in FIG. 1, the media storage devices 110 are coupled to the media players 120. The media storage devices 110 and the media players 120 are shown in FIG. 1 as separate devices to depict the separate functions of media storage and media playback; however, the media players may perform both the storage and playback functions. For example, a media player may comprise a DVD player that includes a hard drive for the storage and playback of digital video. In other embodiments, the storage of media and the playback/viewing of media are performed by separate devices. For this embodiment, the media players 120 playback content stored on the media storage devices 110. For example, a video clip stored on media storage device "1" may be played on any of the applicable "m" media players 120.

The storage devices 110 and media players 120 are controlled by management component 130. In general, management component 130 permits users to aggregate, organize, control (e.g., add, delete or modify), browse, and playback media available within the media space 100. The management component 130 may be implemented across multiple devices. The media space of FIG. 1 shows a plurality of users 140 to depict that more than one user may playback/view media through different media players. The system supports playback of different media through multiple media players (i.e., the system provides multiple streams of media simultaneously). The users 140, through management component 130, may also organize, control, and browse media available within the media space. The management component 130 provides a distributed means to manage and control all media within the media space. As described more fully below, the convergence media platform provides a common language to permit disparate devices to communicate (i.e., different devices utilize different network protocols).

Figure 2:
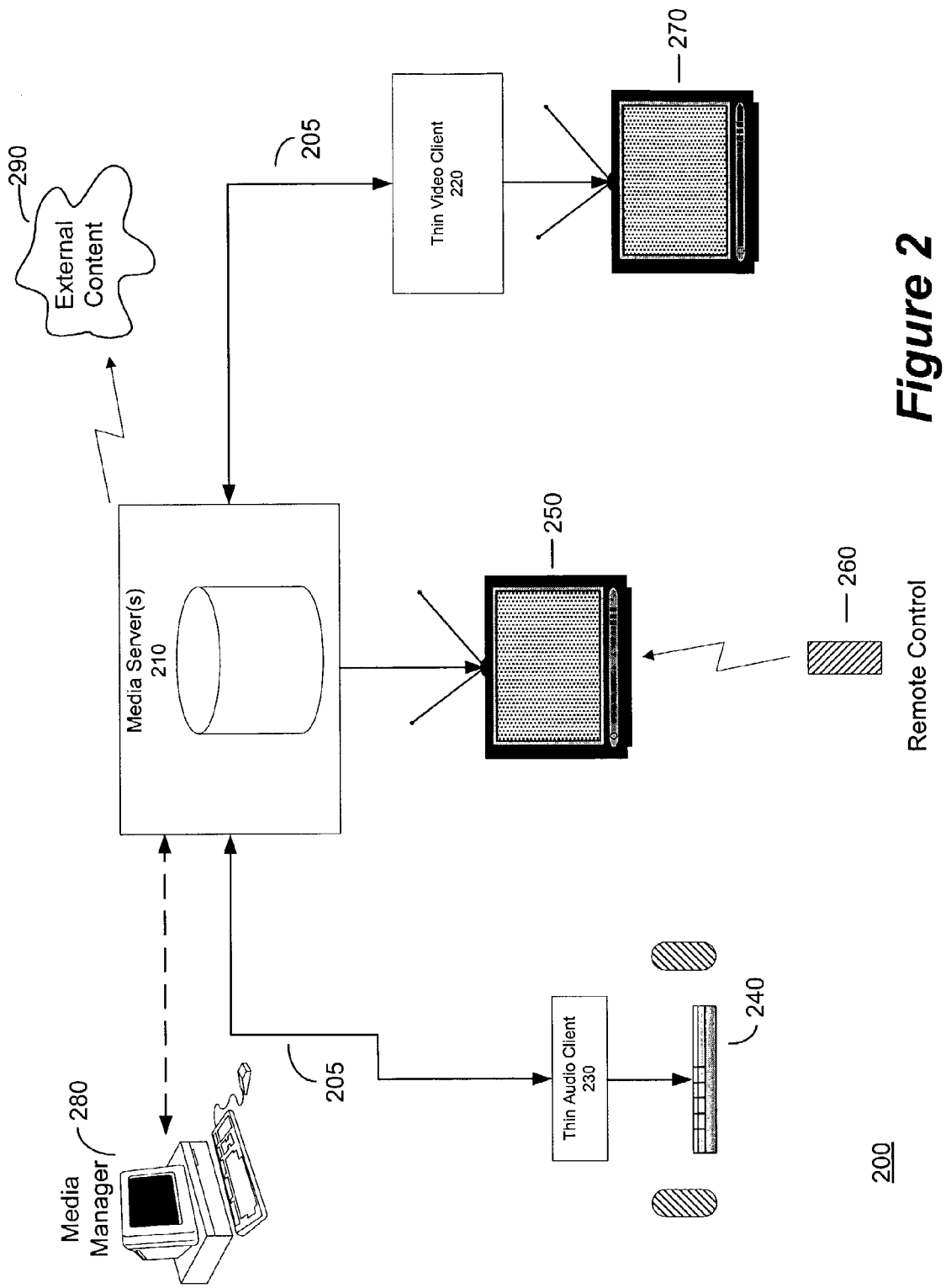
FIG. 2 illustrates one embodiment for integrating devices into a single media space.

FIG. 2 illustrates one embodiment for integrating devices into a single media space. For this embodiment, a media space 200 includes at least one media server 210 (e.g., a media space may include many media servers). The media server 210 stores media for distribution throughout the media space 200. In addition, the media server 210 stores system software to integrate the components of the media space, to distribute media through the media space, and to provide a user interface for the components of the media space. The media server 210 is coupled to different types of media players, including televisions 250 and 270, as well as an audio player 240 (e.g., stereo system). For this embodiment, the media server 210 is also coupled to a media manager 280 and to external content provider(s) 290.

For this embodiment, the media server 210 executes software to perform a variety of functions within the media space. Thus, in this configuration, the media server 210 operates as a "thick client." A user accesses and controls the functions of the media convergence platform through a system user interface. The user interface utilizes the thick and thin clients, as well as some media players (e.g., televisions 250 & 270). In one embodiment, the user interface includes a plurality of interactive screens displayed on media player output devices to permit a user to access the functionality of the system. A screen of the user interface includes one or more items for selection by a user. The user navigates through the user interface using a remote control device (e.g., remote control 260). The user, through use of a remote control, controls the display of screens in the user interface and selects items displayed on the screens. A user interface displayed on a television permits the user, using a remote control, to perform a variety of functions pertaining to the media available in the media space.

The components of the media convergence platform are integrated through a network. For example, in the embodiment of FIG. 2, media server 210 communicates to thin audio client 230 and thin video client 220 through network 205. Network 205 may comprise any type of network, including wireless networks. For example, network 205 may comprise networks implemented in accordance with standards, such as Ethernet 10/100 on Category 5, HPNA, Home Plug, IEEE 802.11x, IEEE 1394, and USB 1.1/2.0.

For the embodiment of FIG. 2, one or more thin video clients are integrated into the media space. Specifically, a thin video client 220 is coupled to media server 210 to provide playback of digital media on television 270. The thin video client 220 does not store media. Instead, the thin video client 270 receives media from media server 210, and processes the media for display or playback on television 270 (e.g., a standard television). For example, media server 210 transmits a digital movie over network 205, and the thin video client processes the digital movie for display on television 270. In one embodiment, the thin video client 220 processes the digital movie "on the fly" to provide NTSC or PAL formatted video for playback on television 270. The thin video client 220 may be integrated into the television 270. In one embodiment, a user interface is implemented using media server 210 and thin video client 220 for display on television 270. For this embodiment, the user, using a remote control for television 270, selects items displayed on television 270 to command the system.

The media convergence platform system also optionally integrates one or more thin audio clients into the media space. For the embodiment of FIG. 2, a thin audio client 230 receives digital music (e.g., MP3 format) from media server 210 over network 205, and processes the digital music for playback on a standard audio system 240. In one embodiment, the thin audio client 210 includes a small display (e.g., liquid crystal display "LCD") and buttons for use as a user interface. The media server 210 transmits items and identifiers for the items for display on the thin audio client 230. For example, the thin audio client 230 may display lists of tracks for playback on audio system 240. The user selects items displayed on the screen using the buttons to command the system. For example, the thin audio client screen may display a list of albums available in the media space, and the user, through use of the buttons, may command the user interface to display a list of tracks for a selected album. Then, the user may select a track displayed on the screen for playback on audio system 240.

The media manager 280 is an optional component for the media convergence platform system. In general, the media manager 280 permits the user to organize, download, and edit media in the personal computer "PC" environment. The media manager may store media for integration into the media space (i.e., store media for use by other components in the media space). In one embodiment, the media manager 280 permits the user to perform system functions on a PC that are less suitable for implementation on a television based user interface.

The media space may be extended to access media stored external to those components located in the same general physical proximity (e.g., a house). In one embodiment, the media convergence platform system integrates content from external sources into the media space. For example, as shown in FIG. 2, the media server 210 may access content external to the local network 205. The external content may include any type of media, such as digital music and video. The media convergence platform system may be coupled to external content 290 through a broadband connection (i.e., high bandwidth communications link) to permit downloading of media rich content. The external content may be delivered to the media convergence platform system through use of the Internet, or the external content may be delivered through use of private distribution networks. In other embodiments, the external content may be broadcasted. For example, the media server 210 may access external content 290 through a data casting service (i.e., data modulated and broadcast using RF, microwave, or satellite technology).

Client Device Aggregation

As used herein, a "device" connotes a home network client that supports a collection of services to operate a broader functionality. Also, as used herein, a "media server" is an entity on the home network that stores or presents media items to the network. Furthermore, a "node" connotes any entity on a home network, including a device and/or a media server.

The convergence media platform utilizes a "peer-to-peer" architecture. All client devices on the media platform have the ability to communicate with other devices, including multiple client devices and multiple servers. This architecture permits a device to obtain all media available on the network and to aggregate the media for presentation on that device.

A device, including a client device or a server device, may enter and/or exit the home network, at any time, and still maintain full functionality. Thus, when a device is powered off, other devices automatically recognize that the device is no longer available on the home network. When a new device is added or a portable device comes onto the network, the other nodes automatically recognize the new devices. The other nodes may utilize the services on the added device. A new media server may also automatically recognize new devices, as long as at least one other media server is currently on the network.

Figure 3:
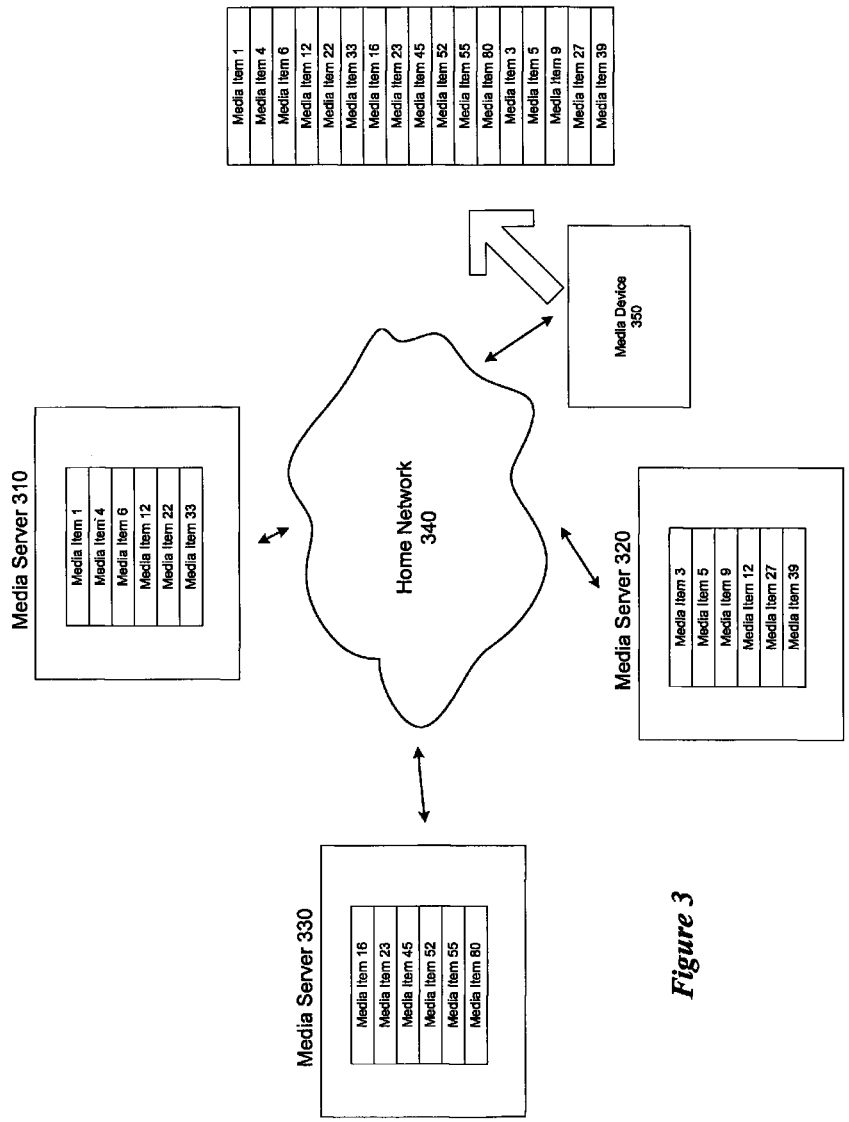
FIG. 3 illustrates client device aggregation of media in accordance with one embodiment of the present invention.

FIG. 3 illustrates client device aggregation of media in accordance with one embodiment of the present invention. For this example, three media servers (310, 320, and 330) are coupled to home network 340. As shown in FIG. 3, each media server stores various media items (e.g., video, audio, photos, etc). For example, server 310 stores media items 1, 4, 6, 12, 22 and 33. For this example, media device 350 is on the home media network 340. Media device 350 may comprise a DVD player, and the media items, stored on media servers 310, 320 and 330, may comprise DVDs.

After completing a discovery process, media device 350 determines relevant media items stored on other devices (e.g., media servers) available on home network 340. Thus, media device 350 aggregates all media, relevant to media device 350, for use at media device 350 (i.e., playback, control. etc.). As shown in FIG. 3, media device 350 aggregates all media items stored on media servers 310, 320 and 330.

The media convergence platform provides the capability to identify all media items as unique. For example, all media items classified under the genre "pop" are recognized as such, and the system displays them accordingly. An artist may have the same name but not be the same artist. The media convergence platform utilizes a distributed database that allows the system to distinguish among unique media items. Thus, if a media item is stored on two different media servers, then during client device aggregation, the device recognizes only a single media item. For the example of FIG. 3, media item 12 is stored in both media server 320 and media server 310. During client media aggregation, media device 350 recognizes media item 12, stored on both media servers 310 and 320, as the same item. Thus, media device 350 only recognizes media item 12 as a single item.

The underlying protocols do not permit a client device to aggregate media items from devices on the home network. The protocols themselves have no requirement to support a distributed system. For this embodiment of the media convergence platform, aggregation logic creates a distributed system using non-distributed protocols. The aggregation logic uses multiple protocols to integrate devices on the home network.

Figure 4:
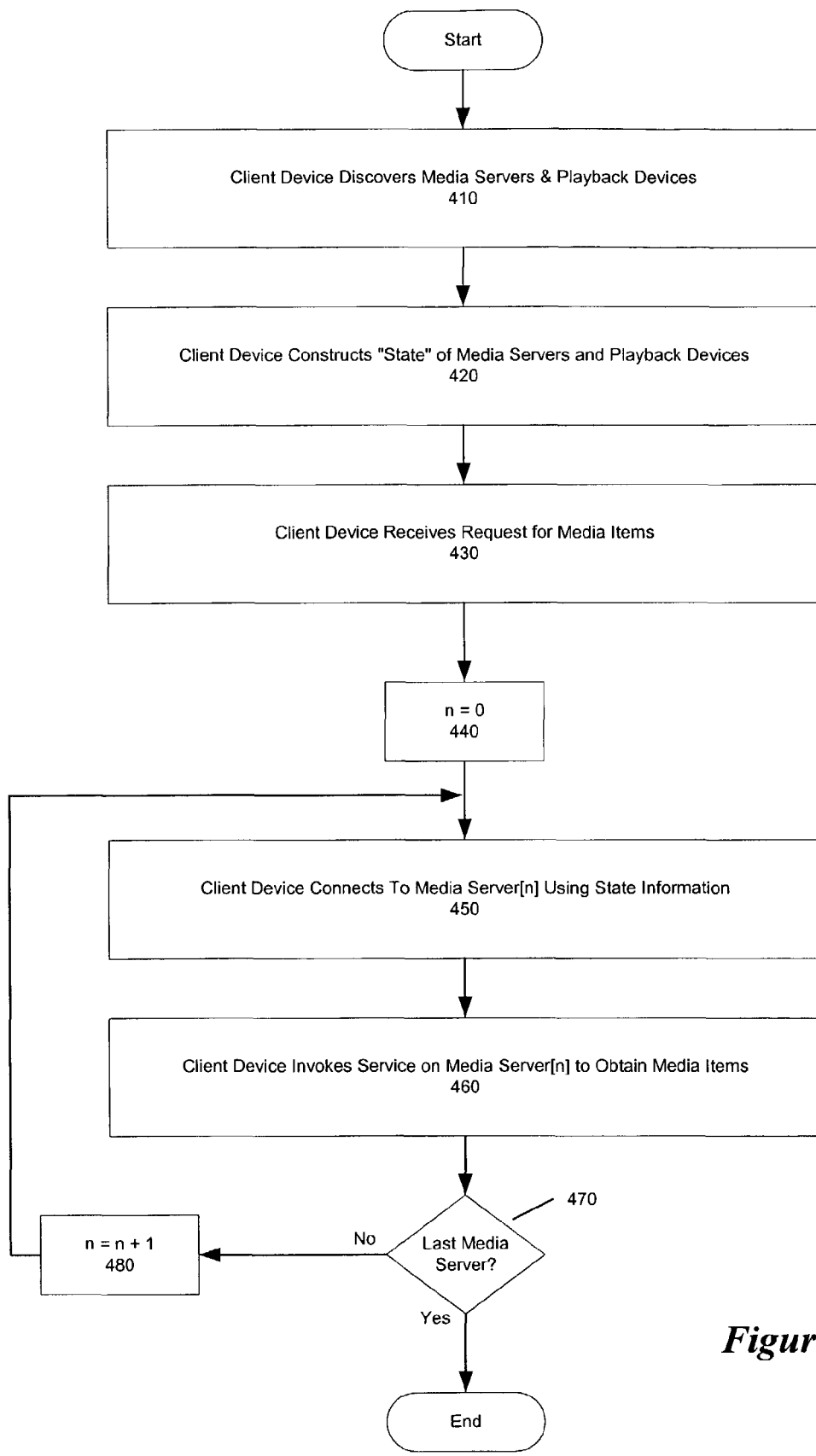
FIG. 4 is a flow diagram illustrating one embodiment for client media aggregation over a network.

FIG. 4 is a flow diagram illustrating one embodiment for client media aggregation over a network. Initially, a client device discovers devices (e.g., media servers) on the home network (block 410, FIG. 4). One embodiment for discovering devices on the home network is described more fully below. Based on information learned in the discovery process, the client device constructs state information for the discovered devices (block 420, FIG. 4). The client device receives a request for media items (block 430, FIG. 4). The aggregation logic receives requests from software components operating above the aggregation logic. For example, the client device may comprise a television operating a user interface. A user may request, using a remote control device, a list of all the music items available on the home network. For this example, application logic on the user interface translates the request for music items, and forwards the request to the aggregation logic.

The aggregation logic for the client device acquires media items from all media servers that contain those media items. For example, if the client requests music items, the client device acquires all music items from all media servers available on the network. This operation is illustrated in FIG. 4 (blocks 440, 450, 460, 470 and 480). Specifically, an identifier (i.e., n=0) to select a specific media server is set (block 440, FIG. 4). The client device connects to a selected media server (e.g., media server[0]) using state information acquired during the discovery process (block 450, FIG. 4). Specifically, the client device translates the request for media items to a protocol supported by the selected media server, and forwards the request to the media server. In one embodiment, the client device invokes a service on the selected media server to obtain the media items (block 460, FIG. 4). In one embodiment, the client device invokes a content manager service on the media server to acquire a list of media items available. If there are more media servers available on the home network, the client device identifies a new media server to acquire media items (blocks 470 and 480, FIG. 4). When the client device has acquired a list of media items from all the available media servers, the process is complete.

Figure 5:
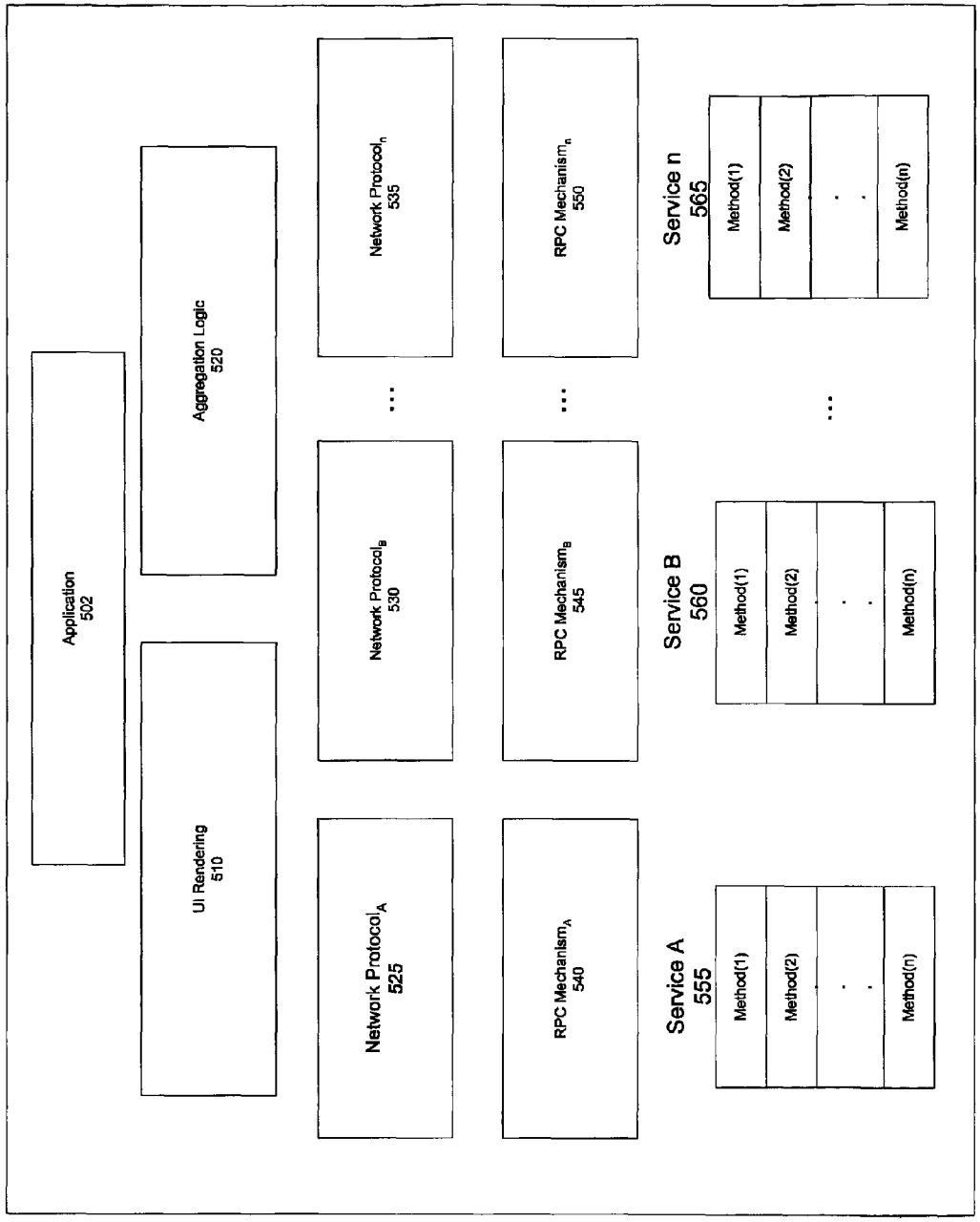
FIG. 5 is a block diagram illustrating one embodiment for software components operating on a media convergence platform device.

FIG. 5 is a block diagram illustrating one embodiment for software components operating on a media convergence platform device. Software components 500 include, at the highest level, application software 502. The application software 502 implements functionality for an underlying device. For example, application software 502 may implement functions for a DVD player. As shown in FIG. 5, underneath the application software 502 is aggregation logic 520. As discussed above, aggregation logic 520 permits a client device to aggregate media items on the home network.

The software components 500 also include user interface ("UI") rendering logic 510. UI rendering component 510 translates scene information to display information suitable for display on the client device. The UI rendering component 510 also renders the display data. For example, if the underlying client device includes a television display (e.g., CRT), then UI rendering engine 510 generates graphics data from scene information, and renders the graphics data on the television display. If the display on the client device is a LCD display, then UI rendering engine 510 generates lists from scene information, and displays the lists on the LCD display.

As shown in FIG. 5, the client device incorporates one or more network protocols and remote procedure calls ("RPC") mechanisms. For example, FIG. 5 shows that the client device supports network protocol$_A$ (525), network protocol$_B$ (530), and network protocol$_n$ (535). For this example, client device software 500 supports RPC mechanism$_A$ (540), RPC mechanism$_B$ (545), and RPC mechanism$_n$ (550).

The client device software 500 supports one or more services. As shown in FIG. 5, one of more methods of a service are accessible through an interface. In general, the methods, when invoked, provide specific functionality for the underlying service. For this example, client device software 500 includes service$_A$ (555), service$_B$ (560), and service$_n$ (565). Each service is associated with one or more methods (i.e., method(1)-method(n)).

In one embodiment, the media convergence platform supports a plurality of underlying protocols. In general, the protocols define commands, RPC mechanisms, and interfaces to services. In one embodiment, the media convergence platform supports an industry defined UPnP protocol. In general, the UPnP protocol defines discovery over IP networks, an RPC mechanism, and interfaces for activating services. UPnP services include: a content directory service, a connection manager service, an audio/video ("A/V") transport service and an A/V control service.

In one embodiment, the media convergence platform also supports a proprietary protocol (i.e., non-industry standard protocol). For this embodiment, the proprietary protocol defines a network discovery process, an RPC mechanism, and an interface to services. The services include a content manager and a media player service. The content manager service allows a client device to interface to a database. Specifically, using the content manager service, the client device may extract information (e.g., URL to identify media, metadata, etc.) from a database on another network device. Thus, the content manager service provides a means for a device of the media convergence platform system to query a database. The media player service defines an interface to permit playback functionality (e.g., initiate and control media streams).

In one embodiment, the discovery process on the proprietary protocol implements asynchronous based messaging. The discovery protocol operates on any network that supports packet based messaging or on a serialized network. In one embodiment, the discovery protocol includes an "announce" command, a "discovery" command, and a "bye-bye" command. The announce command is used by a device to announce its presence on the home media network. A discovery command is a request for an announcement (i.e., queries whether any client devices are on the home network). The "bye-bye" command is used by a client device to announce that the client device is leaving the network. In one embodiment, there are two types of announcements and two types of "bye-bye" commands: one for devices and one for services.

In one embodiment, the RPC mechanism, supported by the proprietary protocol, uses a packet based protocol. The services include methods and an identification number to permit a device on the home network to construct RPC based packets with the appropriate arguments. In general, an RPC mechanism permits a device to control another device on the network. The protocol is effectuated through requests and responses. The RPC packets include a header. In one embodiment, the header contains: version information, a command class (maps to a particular service), the command (the method the device is requesting or the response coming from the method), an identification (identification of requests or identification of responses corresponding to a request), and a length. After the header, the RPC protocol format specifies data (i.e., arguments for requests and returns values for responses).

Figure 6:
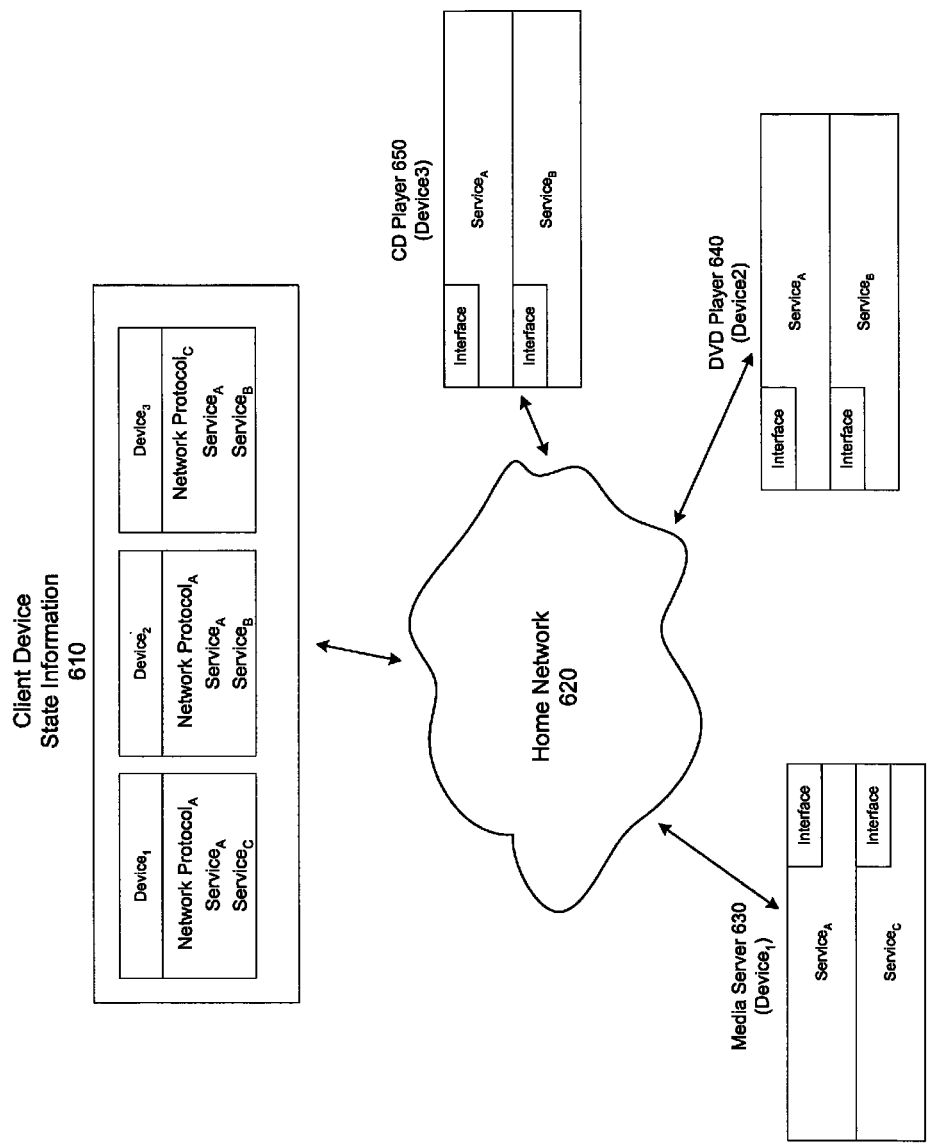
FIG. 6 is a block diagram illustrating an example home network for the media convergence platform.

FIG. 6 is a block diagram illustrating an example home network for the media convergence platform. For this example, a home network includes CD player 650, DVD player 640, and media server 630. A client device (610) enters the home network 620, and discovers, using a supporting protocol, three devices (e.g., CD player 650, DVD player 640, and media server 630). As shown in FIG. 6, client device 610 stores state information for each of the devices discovered on home network 620. Specifically, client device 610 stores, for device$_1$ (media server 630) a supporting network protocol (i.e., network protocol$_A$) as well as a list of services supported by the devices (i.e., service$_A$ and service$_C$). The network protocol also specifies an RPC mechanism to execute remote procedure calls on media server 630. Similarly, state information for device$_2$ (i.e., DVD player 640) indicates that device$_2$ supports network protocol$_A$ and implements service$_A$ and service$_B$. Device$_3$, CD player 650, supports network protocol$_C$, and implements service$_A$ and service$_B$.

As shown in FIG. 6, each service (e.g., service$_A$, service$_B$, and service$_C$) supports an interface. The interface defines a specification to provide a means to access the methods or commands within a service. As such, the client device 610 utilizes services (service$_A$ or service$_B$) on CD player 650 through their respective interfaces. Note that media server 630, DVD player 640 and CD player 650 all implement service$_A$. Each interface for service$_A$ is the same to permit uniform accessibility to the service. However, the implementation of service$_A$ in each of the devices may be different.

In one embodiment, a media convergence platform implementation provides security. For this embodiment, the announcement command is open ended, such that the protocol only defines a minimum specification for communication. Thus, announcement protocols may support multiple network specifications, including TCP and secure sockets layer ("SSL"). The protocol supports implementation on TCP/IP networks. In addition, the protocol supports SSL operating on TCP/IP networks. SSL permits secure communications, including authentication, between two parties on a network.

The proprietary protocol also permits an implementation using partial security. For this embodiment, a service may include some methods that require secure communications and other methods that do not require secure communications. Thus, some methods utilize SSL technology to realize secure communications between two devices on the home network.

Discovery

Figure 7:
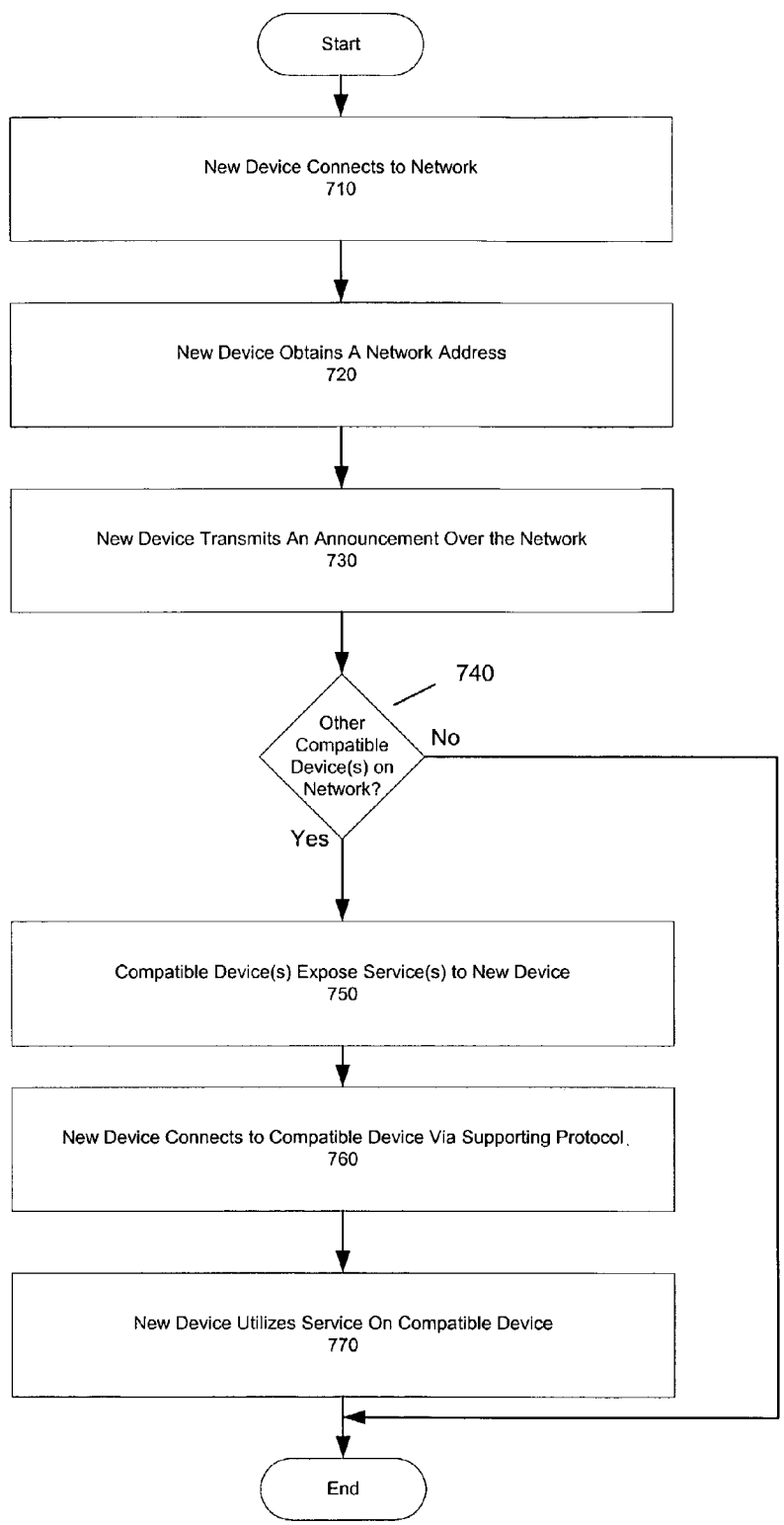
FIG. 7 is a flow diagram illustrating one embodiment for discovering devices in the media convergence system.

FIG. 7 is a flow diagram illustrating one embodiment for discovering devices in the media convergence system. A new device (i.e., a device not currently connected to the network) is connected to the home media network (710, FIG. 7). In order to communicate on the network, the new device obtains a network address (block 720, FIG. 7). For example, in an IP network, the client requires an IP address. If the underlying network supports TCP/IP, then the client device determines if there is a DHP server. If so, the DHP server assigns the IP address to the new device. If no DHP server is available to assign the new device an IP address, then the new device selects an IP address from a pool and determines whether any other device on the home network has that IP address. If no other device on the network has that IP address, then the client device uses this IP address. This process of auto IP addressing allows communication on a home network within a single subnet.

The new device transmits an "announcement" command over the network (block 730, FIG. 7). The format of the announcement command complies with a protocol supported by the devices. The new device may broadcast or multicast the announcement command over the network. For example, in an IP network, the new device may multicast the announcement in order to expand subnets if the home network includes a gateway. A multicast format is used to specify specific IP addresses (e.g., transmitting an announcement only to those devices on the network interested or compatible with the new device). As used herein, compatible devices are those devices that may be interested in communicating with the client device.

In response to the new device's announcement command, the new device constructs state information. In general, the state information provides details regarding devices available on the network. The state information includes protocols and services supported by those devices. When compatible devices on the network receive the announcement command, those compatible devices may add information, encapsulated in the announcement command, to a local cache.

If there are no compatible devices on the network or the new device does not desire to utilize a service on the network, then the process terminates. For example, if the new device is an MP3 player, then compatible devices include those media servers storing MP3 audio as well as other MP3 players. If there are other compatible devices on the network, those devices expose one or more services to the new device (block 750, FIG. 7). To discovery services on the network, the new device transmits a discovery command and waits for a response. For this example, a media server, which stores MP3 audio, exposes an interface to allow the new device to aggregate the MP3 audio stored on that media server. Similarly, a compatible MP3 player exposes a service, through a pre-defined interface, to permit the new device to play MP3 audio stored on the new device at the compatible MP3 player.

In response to the request (e.g., new device application logic), the new device connects to a compatible device via a supporting protocol (block 760, FIG. 7). Specifically, the device translates the protocol for the appropriate device using the state information. For example, if the compatible device supports an industry standard protocol, then the new device selects the industry standard protocol to communicate to that device. The new device utilizes the services on the compatible device (block 770, FIG. 7).

A media server entering a home network is one example of the discovery process. For this example, the media server, after obtaining a network address, transmits an announcement command over the network. The media server announces the services it supports (e.g., content manager, media player service), and exposes interfaces to network clients to permit access to those services. If a device enters the network, the device waits for an announcement from the server. When the client identifies the media server, the client connects to the media server via a protocol the server specified in the announcement command. This process allows the client device to navigate media on the media server. Using the supporting protocol, the client device connects to a playback device, either itself or another playback device, and instructs the playback device to play the item that a user selected from those media items available on the media server.

Convergence Platform Data Model

The media convergence system operates in conjunction with a data model. The format and arrangement of underlying database is not defined by the media convergence system. In the data model, objects (e.g., media items) have unique identifications in the database. The objects also have an associated "type" (e.g., photos, audio tracks, video clips, etc.). The data model defines relationships to define structure and hierarchy among objects and types.

In one embodiment, the database for the media convergence system comprises a relational database (e.g., key value pair database or standard query language ("SQL") database). For this embodiment, the database maps objects for storage in the relational database. Although one embodiment of the media convergence system utilizes a relational database, other databases may be used without deviating from the spirit or scope of the invention.

Figure 8:
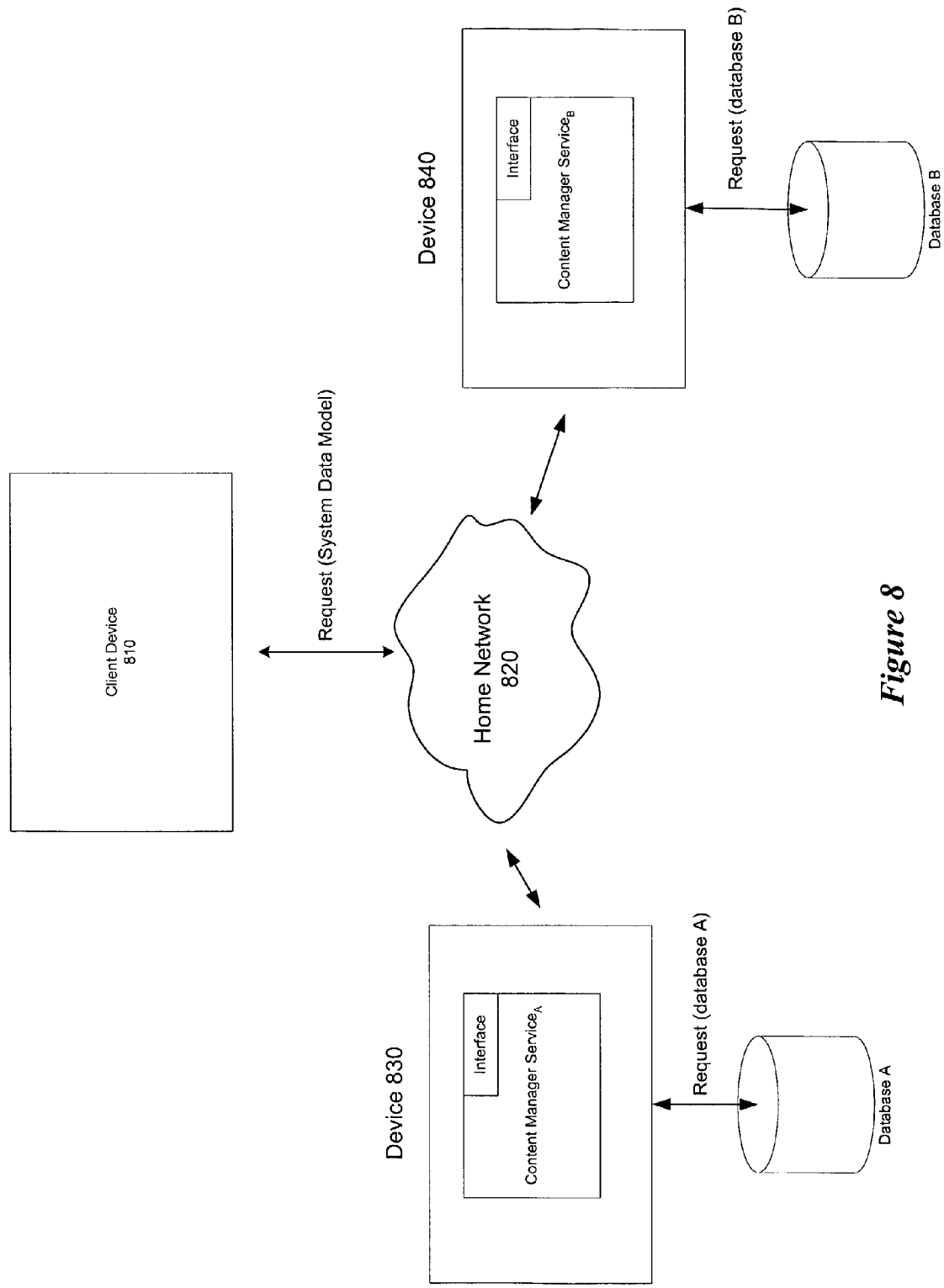
FIG. 8 is a block diagram illustrating one embodiment of accessing a data store through the media convergence platform system.

FIG. 8 is a block diagram illustrating one embodiment of accessing a data store through the media convergence platform system. A client device 810 is connected to a home network 820. As shown in FIG. 8, device 830 and device 840 are also coupled to home network 820. Device 840 includes a persistent data store, labeled Database B in FIG. 8. Similarly, device 830 includes a persistent data store, Database A. Device 830 and 840 support a service that permits access to information in the persistent data stores. In one embodiment, the content manager service is used. Specifically, a first implementation of the content manager service$_A$ supports access to Database A, and a second implementation of the content manager service$_B$ supports access to Database B.

Client device 810 may obtain information from Database A and Database B. To query Database B, client device 810 obtains a connection with device 840 in a manner as described above. The client device 810 invokes methods via an interface on content manager service$_B$. For example, client device 810 may desire to obtain a list of all genres recognized by the media convergence system. This information may be stored in database B. Client device 810 generates a request using data model parameters specified in the interface for content manager service$_B$. For the example above, client device 810 generates a request to content manager service$_B$ to identify all objects with the type "genre." In response to the request, client manager service$_B$ translates the data model notion of "genre" to a query compatible with Database B. For example, if Database B supports SQL, then content manager service$_B$ generates a SQL request to Database B to obtain all records in a table with the type "genre."

The implementation of the content manager service performs the translation from the media convergence system data model to an underlying database implementation. For the example in FIG. 8, the content manager service$_A$ supports a first translation to Database A, and the content manager service$_B$ supports a second translation for requests for data stored in Database B. Accordingly, client device 810 uses the same request, as defined by the interface on both content manager services, to access different database implementations (e.g., Database A and Database B).

In one embodiment, the media convergence platform system is implemented using a database. In general, the database stores objects, attributes associated with those objects, and associations between those objects. For example, the database stores an identification of musical tracks available within the media space. The database stores a plurality of attributes, so as to associate one or more attributes for each musical track. In one embodiment, the objects include albums, artists, tracks, genres, and playlists. Thus, a track may be associated with one or more albums, one or more artists, one or more genres, and one or more playlists. Attributes include titles, creation dates, and multiple associated media files. Thus, a track may have associated album art, lyrics, etc.

The media convergence platform database permits classifying audio tracks in an extremely versatile manner. For example, a user may desire to classify a track or album (i.e., collection of tracks) in more than one genre because the user associates the music with two different types of genres (e.g., rock and blues). Also, a musical track may be a result of a collaboration between two artists. To properly classify the track, a user of the media convergence platform may associate the track with two different artists. As illustrated by the above examples, the media convergence platform system provides maximum flexibility in classifying and organizing music.

The media convergence platform system handles each classification or item as a distinct object. For example, for the music jukebox application, playlists, genres, artists, albums, and tracks are all handled as individual objects. This feature, which supports independent objects for organization and classification of items, provides maximum flexibility in organizing and classifying music. For example, the user may create nested playlists, such that a first playlist may be wholly contained within a second playlist. Prior art music systems only deal with playlists by tracks. For these prior art systems, a playlist only consists of tracks. In the media convergence platform system, playlists may comprise any "objects." Therefore, playlists may be created from one or more artists, genres, albums or other playlists.

The use of objects in organizing and playing music also permits artists with the same name to be treated differently. Prior art digital music systems store metadata to identify artists. If a user executes a search on the metadata using these prior art systems, there is no way for the system to differentiate among artists with the same name. In the media convergence platform system, each artist is treated as an object. Thus, two artists with the same name are two distinct objects, and may be manipulated as two separate artists.

The media convergence system utilizes distributed iterators. A response to a query to a database may generate a huge amount of data. In one embodiment, the media convergence platform protocol supports transmitting a portion of the data, and maintaining a pointer to identify the data that has been sent. In one embodiment, the protocol uses iterators. The use of iterators by the media convergence platform allows the system to track a portion of data (e.g., a list) transferred from one device to another device. The iterator is implemented such that the iterator dynamically changes if items in the database change during transfer of the data. In general, the iterator specifies a position in an array. A list is a result from the database. For example, the response to a query to a database may produce a list of audio tracks. Subsequently, an audio track, extracted as part of the example query, may be deleted. In another scenario, an audio track, specified by the query, may be added to the database.

If the media convergence system is implemented using the proprietary protocol and a TCP/IP network, the system associates state with the request for database information. This state information is utilized to maintain iterator information.

User Interface

In one embodiment, the media convergence platform separates the user interface ("UI") scene manager and application logic from the UI rendering engine. In one implementation, the system defines user interface displays in terms of "scenes." In general, a scene is an abstract layout for a display, and it consists of logical entities or elements. For example, a scene may define, for a particular display, a title at the top of the display, a message at the bottom the display, and a list of elements in the middle of the display. The scene itself does not define the particular data for the title, message and list. In one implementation, the user interface software comprises a scene manager, UI application logic, and UI rendering engine. In general, the scene manager generates the abstract layout, in terms of logical entities, for a UI display. The application logic receives user input and determines the scene and data to populate the scene based on the logical flow of the user interface. For example, a user may select a first item displayed on the current UI display. In response, the UI application logic selects, if applicable, a new scene and data to populate the new scene based on the user selection.

The application logic is implemented independent of the scene and the UI rendering. The UI application logic obtains, from a scene manager, the scene in terms of the abstract elements. The application logic then populates the logical elements with data, and transfers the abstract layout with data to the rendering engine. The rendering engine then displays the scene and data with display elements particular to the output display for that device. The display elements include display resolution, font size for textual display, the ability to display graphics, etc. For example, if the output device is a television screen, then the UI rendering engine generates graphics data (i.e., RGB data) suitable for display of the scene on the television screen (e.g., proper resolution, font size, etc.). If the output display is a liquid crystal display ("LCD"), the UI rendering engine translates the scene logical entities to a format suitable for display on the LCD display. For example, if the display for a device is only capable of displaying lists, then the UI rendering engine translates the scene with data to display only lists. This translation may result in deleting some information from the scene to render the display. The UI rendering engine may convert other logical elements to a list for display on the LCD display.

A user interface implementation for a media convergence platform that separates the scene manager and UI application logic from the UI rendering engine has several advantages. First, the scene manager/application logic does not require any information regarding the capabilities of the output display. Instead, the scene manager and application logic only view the UI display in terms of logical entities, and populate data for those logic entities based on user input and logical flow of the user interface. Second, this separation permits a graphical designer of a user interface system to easily change the scenes of the user interface. For example, if a graphical designer desires to change a scene in the user interface, the graphical designer only changes the abstract layout of the scene. During runtime, the application logic receives the revised abstract layout, populates the revised abstract layout with data, and transmits the abstract layout with data to the UI rendering engine. The UI rendering engine then determines the specific display elements to display the scene based on the output device. Thus, a change to the scene does not require a change to the display elements particular to each output display because the conversion from the scene to the display elements occurs locally.

In one embodiment, the media convergence platform permits implementing user interface software remote from a device. In one implementation, the scene manager and application logic are executed on a device remote from the device displaying a user interface. The device displaying the user interface only contains the UI rendering engine. For this implementation, the data and scenes for a user interface exist on a remote device. Using this implementation, the scene interface (interface between the scene manager and the application logic) is remote from the device rendering the display. The remote device does not transfer large bitmaps across the network because only scene information with data is transferred. This delineation of functions provides a logical boundary between devices on a network that maximizes throughput over the network. In addition, a remote device hosting the scene manager/application logic does not require information regarding display capabilities of each device on the home network. Thus, this implementation pushes the UI rendering software to the device rendering the images, while permitting the application logic to reside on other devices. This architecture permits implementing a thin client in the media convergence platform because the thin client need not run the scene manager and application logic software.

Figure 9:
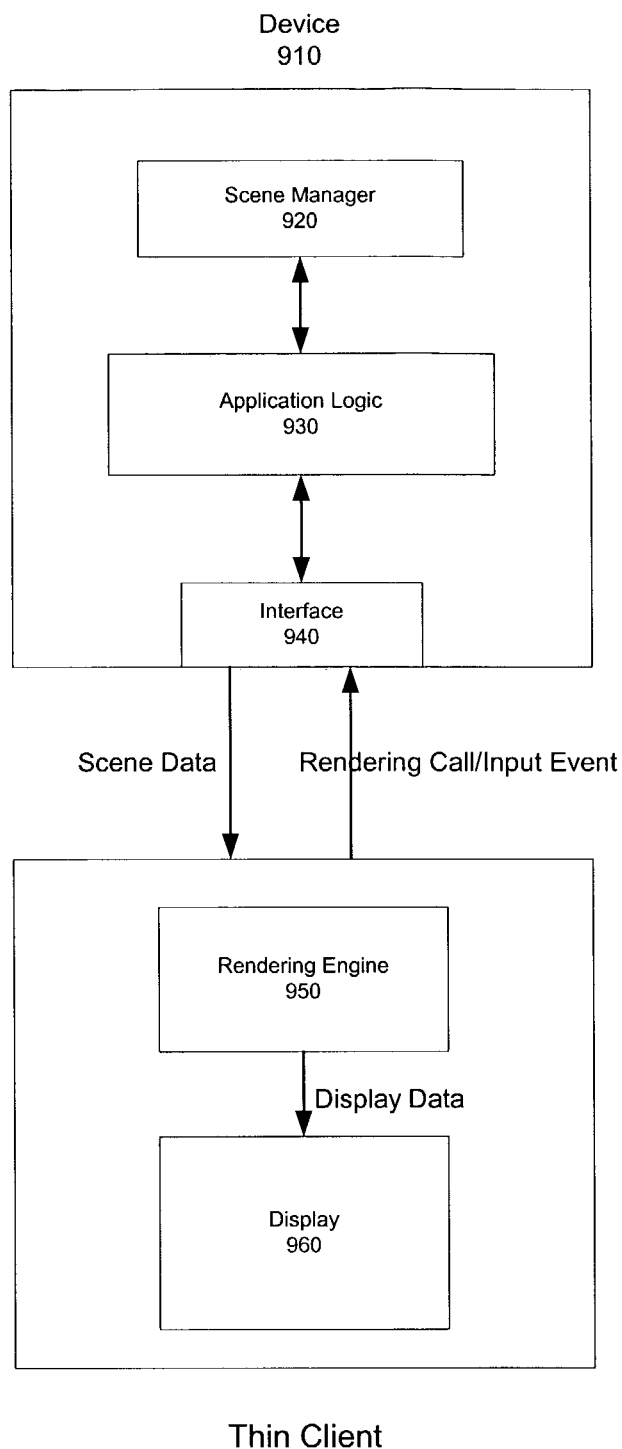
FIG. 9 is a block diagram illustrating one embodiment for implementing a user interface in the media convergence platform.

FIG. 9 is a block diagram illustrating one embodiment for implementing a user interface in the media convergence platform. For this example embodiment, a device (910) includes scene manager 920 and application logic 930. Device 910 may comprise a media server with considerable processing capabilities, such as a computer or set-top box. A thin client device 970 has a display 960, for displaying information to a user (e.g., displaying data to implement a user interface), and a rendering engine 950. The rendering engine 950 receives, as an input, scene data, and generates, as an output, display data. Display data consists of those elements necessary to rendering an image on the display 960. For example, if the display 960 comprises a graphics display, then display data includes information (e.g., RGB data) to render a graphical image on a display.

FIG. 9 illustrates separating a UI rendering engine, implemented on a display device, from a scene manager and application logic implemented on a remote device (device 910). In operation, a list of objects (e.g., albums) may be displayed on display 960. The user may select an album for playback. In response to the user selection, the scene manager 920 may generate an abstract scene consisting of a list of audio track elements and control information. The abstract scene is passed from scene manager 920 to application logic 930. The application logic 930 populates the abstract scene elements with data particular to the selection. Thus, for this example, application logic 930 populates the list of audio track elements with the names of the audio tracks for the album selected by the user. The application logic 930 then transmits, through interface 940, the scene data to the UI rendering engine 950 on thin client 970. The UI rendering engine 950 converts the scene elements with data to the display elements for display on display 960. For example, if display 960 is an LCD display, then rendering engine 950 generates a textual list of audio tracks.

What is claimed is:

1. A method for aggregating media in a media system comprising network devices coupled through a network, the network devices comprising a first storage device, a second storage device, and a client device that communicate with each other through the network by using network protocols, the method comprising:

receiving though the network, at the client device, first and second state information from the first and second storage devices respectively, each state information specifying a network protocol and a content service supported by the respective storage device configured to store digital media files, the content service for allowing other network devices to access digital media files or information regarding the digital media files stored on the respective storage device, first and second network protocols associated with the first and second storage devices respectively being different;

upon the client device being coupled to the network, sending third state information from the client device to the first and second storage devices, the third state information specifying at least one network protocol and at least one service supported by the client device, wherein the media system utilizes a peer-to-peer architecture, wherein the network devices communicate with each other through the network by using network protocols specified in the state information for each network device, and a request sent to a network device is translated to the network protocol specified in the state information for the network device, the request invoking a service specified in the state information for the network device;

receiving, at the client device, a first list of digital media files from the first storage device and a second list of digital media files from the second storage device;

aggregating, at the client device, an overall list of digital media files comprising the first and second lists, wherein a digital media file found on both the first list and the second list is only listed once on the overall list; and in response to user input, playing, at the client device, at least a portion from the overall list of digital media files.

2. The method of claim 1, further comprising:

exposing, at the client device, each service specified in the third state information to the first and second storage devices; and requesting an exposed service of the client device by using a network protocol specified in the third state information.

3. The method of claim 1, further comprising:

sending the first state information from the first storage device to the client device, the first state information further specifying a plurality of services supported by the first storage device;

exposing, at the first storage device, each service specified in the first state information to the other network devices; and requesting, at the client device, an exposed service of the storage device by using the first network protocol specified in the first state information.

4. The method of claim 1, wherein the client device comprises a media player device, the method further comprising:
receiving, at the client device, a user request to play a first digital media file stored on the first storage device;
sending, from the client device to the first storage device, a request invoking a first content service on the first storage device for accessing the first digital media file stored on the first storage device, the request being translated to the first network protocol by the client device; and
receiving, at the client device, the first digital media file for play back.

5. The method of claim 1, wherein:
digital media files comprise audio media files, video media files, or image media files stored on the first and second storage devices;
the client device is configured to playback audio media files; and
aggregating the overall list of digital media files comprises aggregating a list of only audio media files stored on the first and second storage devices.

6. The method of claim 1, wherein:
digital media files comprise audio media files, video media files, or image media files stored on the first and second storage devices;
the client device is configured to playback video media files; and
aggregating the overall list of digital media files comprises aggregating a list of only video media files stored on the first and second storage devices.

7. The method of claim 1, wherein:
digital media files comprise audio media files, video media files, or image media files stored on the first and second storage devices;
the client device is configured to playback image media files; and
aggregating the overall list of digital media files comprises aggregating a list of only image media files stored on the first and second storage devices.

8. The method of claim 1, wherein aggregating the overall list of digital media files further comprises:
determining whether each digital media file on the overall list is unique from other digital media files on the overall list.

9. The method of claim 1, wherein the first storage device comprises a media service for downloading and storing digital media files from the Internet.

10. The method of claim 1, wherein the client device aggregates the overall list of digital media files stored on the first and second storage devices, and wherein the client device plays a requested digital media file stored on at least one of the first and second storage devices without persistently storing the requested media file at the client device.

11. A media system for aggregating media, the media system comprising:
a network coupling network devices comprising a first storage device, a second storage device, and a client device that communicate with each other through the network by using network protocols;
the first storage device configured for storing digital media files;
the second storage device configured for storing digital media files;
the client device configured for:
receiving though the network first and second state information from the first and second storage devices respectively, each state information specifying a network protocol and a content service supported by the respective storage device, the content service for allowing other network devices to access digital media files or information regarding the digital media files stored on the respective storage device, first and second network protocols associated with the first and second storage devices respectively being different;
upon the client device being coupled to the network, sending third state information from the client device to the first and second storage devices, the third state information specifying at least one network protocol and at least one service supported by the client device, wherein the media system utilizes a peer-to-peer architecture, wherein the network devices communicate with each other through the network by using network protocols specified in the state information for each network device, and a request sent to a network device is translated to the network protocol specified in the state information for the network device, the request invoking a service specified in the state information for the network device;
receiving a first list of digital media files from the first storage device and a second list of digital media files from the second storage device;
aggregating an overall list of digital media files comprising the first and second lists, wherein a digital media file found on both the first list and the second list is only listed once on the overall list; and
in response to user input, playing at least a portion from the overall list of digital media files.

12. The media system of claim 11, wherein the client device is further configured for:
exposing each service specified in the third state information to the first and second storage devices; and
receiving a request for an exposed service, the request by using a network protocol specified in the third state information.

13. The media system of claim 11, wherein the first storage device is further configured for
sending the first state information to the client device, the first state information further specifying a plurality of services supported by the first storage device;
exposing each service specified in the first state information to the other network devices; and
receiving a request for an exposed service, the request by using a network protocol specified in the first state information.

14. The media system of claim 11, wherein:
the client device comprises a media player device; and
the client device is further configured for:
receiving a user request to play a first digital media file stored on the first storage device;
sending, to the first storage device, a request invoking a first content service on the first storage device for accessing the first digital media file stored on the first storage device, the request being translated to the first network protocol by the client device; and
receiving the first digital media file for play back.

15. The media system of claim 11, wherein:
digital media files comprise audio media files, video media files, or image media files, stored on the first and second storage devices;

the client device is further configured to playback audio media files; and aggregating the overall list of digital media files comprises aggregating a list of only audio media files stored on the first and second storage devices.

16. The media system of claim 11, wherein:

digital media files comprise audio media files, video media files, or image media files stored on the first and second storage devices;

the client device is further configured to playback video medial files; and aggregating the overall list of digital media files comprises aggregating a list of only video media files stored on the first and second storage devices.

17. The media system of claim 11, wherein:

digital media files comprise audio media files, video media files, or image media files stored on the first and second storage devices;

the client device is further configured to playback image media files; and aggregating the overall list of digital media files comprises aggregating a list of only image media files stored on the first and second storage devices.

18. The media system of claim 11, wherein aggregating the overall list of digital media files further comprises:

determining whether each digital media file on the overall list is unique from other digital media files on the overall list.

19. The media system of claim 11, wherein the first storage device comprises a media server for downloading and storing digital media files from the Internet.

20. The media system of claim 11, wherein the client device aggregates the overall list of digital media files stored on the first and second storage devices, and wherein the client device plays a requested digital media file stored on at least one of the first and second storage devices without persistently storing the requested media file at the client device.

21. A non transitory computer readable medium comprising a plurality of instructions, which when executed by the computer, aggregate media in a media system, the media system comprising network devices coupled through a network, the network devices comprising a first storage device, a second storage device, and a client device that communicate with each other through the network by using network protocols, the instructions causing the computer to perform the steps of:

receiving through the network, at the client device, and second state information from the first and second storage devices respectively, each state information specifying a network protocol and a content service supported by the respective storage device configured to store digital media files, the content service for allowing other network devices to access digital media files or information regarding the digital media files stored on the respective storage device, first and second network protocols associated with the first and second storage devices respectively being different;

upon the client device being coupled to the network, sending third state information from the client device to the first and second storage devices, the third state information specifying at least one network protocol and at least one service supported by the client device, wherein the media system utilizes a peer-to-peer architecture, wherein the network devices communicate with each other through the network by using network protocols specified in the state information for each network device, and a request sent to a network device is translated to the network protocol specified in the state information for the network device, the request invoking a service specified in the state information for the network device;

receiving, at the client device, a first list of digital media files from the first storage device and a second list of digital media files from the second storage device;

aggregating, at the client device, an overall list of digital media files comprising the first and second lists, wherein a digital media file found on both the first list and the second list is only listed once on the overall list; and in response to user input, playing, at the client device, at least a portion from the overall list of digital media files.

22. The computer readable medium of claim 21, wherein the plurality of instructions further causes the computer to perform the steps of:

exposing, at the client device, each service specified in the third state information to the first and second storage devices; and requesting an exposed service of the client device by using a network protocol specified in the third state information.

23. The computer readable medium of claim 21, wherein the plurality of instructions further causes the computer to perform the steps of:

sending the first state information from the first storage device to the client device, the first state information further specifying a plurality of services supported by the first storage device;

exposing, at the first storage device, each service specified in the first state information to the other network devices; and requesting, at the client device, an exposed service of the storage device by using the first network protocol specified in the first state information.

24. The computer readable medium of claim 21, wherein the client device comprises a media player device, the plurality of instructions further causing the computer to perform the steps of:

receiving, at the client device, a user request to play a first digital media file stored on the first storage device;

sending, from the client device to the first storage device, a request invoking a first content service on the first storage device for accessing the first digital media file stored on the first storage device, the request being translated to the first network protocol by the client device; and receiving, at the client device, the first digital media file for play back.

25. The computer readable medium of claim 21, wherein:

digital media files comprise audio media files, video media files, or image media files stored on the first and second storage devices;

the client device is configured to playback audio media files; and aggregating the overall list of digital media files comprises aggregating a list of only audio media files stored on the first and second storage devices.

26. The computer readable medium of claim 21, wherein:

digital media files comprise audio media files, video media files, or image media files stored on the first and second storage devices;

the client device is configured to playback video media files; and aggregating the overall list of digital media files comprises aggregating a list of only video media files stored on the first and second storage devices.

27. The computer readable medium of claim 21, wherein:
digital media files comprise audio media files, video media files, or image media files stored on the first and second storage devices;
the client device is configured to playback image media files; and
aggregating the overall list of digital media files comprises aggregating a list of only image media files stored on the first and second storage devices.

28. The computer readable medium of claim 21, wherein aggregating the overall list of digital media files further comprises:
determining whether each digital media file on the overall list is unique from other digital media files on the overall list.

29. The computer readable medium of claim 21, wherein the first storage device comprises a media server for downloading and storing digital media files from the Internet.

30. The computer-readable medium of claim 21, wherein the client device aggregates the overall list of digital media files stored on the first and second storage devices, and wherein the client device plays a requested digital media file stored on at least one of the first and second storage devices without persistently storing the requested media file at the client device.

* * * * *